United States Patent [19]

Sakabe et al.

[11] 4,115,493

[45] Sep. 19, 1978

[54] METHOD FOR MAKING A MONOLITHIC CERAMIC CAPACITOR EMPLOYING A NON-REDUCING DIELECTRIC CERAMIC COMPOSITION

[75] Inventors: Yukio Sakabe; Hiroshi Seno, both of Kyoto, Japan

[73] Assignee: Murata Manufacturing Co., Ltd., Kyoto, Japan

[21] Appl. No.: 826,115

[22] Filed: Aug. 19, 1977

[30] Foreign Application Priority Data

Aug. 19, 1976 [JP] Japan ................................. 51/99397

[51] Int. Cl.² ............................................. C04B 35/46
[52] U.S. Cl. .................................. 264/61; 106/73.31; 264/65; 361/321; 428/469
[58] Field of Search ...................... 106/73.31; 264/61

[56] References Cited

U.S. PATENT DOCUMENTS

| 2,402,517 | 6/1946 | Wainer | 106/73.31 |
| 2,803,553 | 8/1957 | Oshry | 106/73.31 |
| 2,815,291 | 12/1957 | Rogatz | 106/73.31 |
| 2,918,381 | 12/1959 | Plessner et al. | 106/73.31 |
| 2,934,442 | 4/1960 | Herbert | 106/73.31 |
| 3,523,028 | 8/1970 | Prokopowicz | 106/73.31 |
| 3,577,487 | 5/1971 | Sanchez et al. | 264/61 |
| 3,920,781 | 11/1975 | Eror et al. | 264/61 |

FOREIGN PATENT DOCUMENTS 46-8,550  3/1971  Japan .................................. 106/73.31

*Primary Examiner*—Allen M. McCarthy
*Attorney, Agent, or Firm*—Birch, Stewart, Kolasch and Birch

[57] ABSTRACT

Non-reducing dielectric ceramic compositions comprise solid solutions which are represented by the compositional formula:

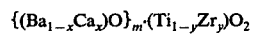

$$\{(Ba_{1-x}Ca_x)O\}_m \cdot (Ti_{1-y}Zr_y)O_2$$

wherein $m$, $x$ and $y$ have the following values:
$1.005 \leq m \leq 1.03$
$0.02 \leq x \leq 0.22$
$0 < y \leq 0.20$ The compositions possess high permittivity and small dielectric loss and maintain high insulation resistance even if fired in reducing atmospheres, thus making it possible to manufacture inexpensive but high reliable monolithic or multi-layer ceramic capacitors.

3 Claims, 2 Drawing Figures

METHOD FOR MAKING A MONOLITHIC CERAMIC CAPACITOR EMPLOYING A NON-REDUCING DIELECTRIC CERAMIC COMPOSITION

SUMMARY OF THE INVENTION

Field of the Invention

The present invention relates to non-reducing dielectric ceramic compositions which possess an excellent insulating property even if fired in reducing atmospheres.

BACKGROUND OF THE INVENTION

Recently, monolithic or multi-layer ceramic capacitors have been used widely in electronic circuits of various electrical products such as, for example, electronic computers, communication devices, television receiving sets, electronic timepieces and radio receivers, because such capacitors are small in construction but large in capacity and high in reliability.

In general, the monolithic ceramic capacitors have been manufactured in the following manner: a dielectric ceramic composition is used consisting essentially of a titanate, several dielectric green sheets are prepared, and then internal electrodes are screened thereon; the green sheets are stacked and pressed to form a monolithic multi-layer body; and the resultant monolithic body is fired at a temperature of 1250° to 1400° C. in air to form a sintered monolithic body, and then provided at its end surfaces with terminations connected with the respective internal electrodes. Therefore, the internal electrode materials used in such a system must meet the following requirements:

(1) They must have a melting point higher than the sintering temperature of the dielectric material; and (2) must not oxidize, and not react with the dielectric material even if heated up to about 1300° C. in air.

These requirements are fully met by base or noble metals such as platinum and palladium, and such noble metals have been used with success in the past as internal electrode materials. However, these electrode materials are quite expensive so that the use of noble metals has resulted in a rise in the cost of multi-layer ceramic capacitors since they occupy about 20 to 50% of the whole cost of the capacitors.

In order to overcome this problem, various attempts have been made to use inexpensive base metals as internal electrode materials. The base metals are oxidizable and reactable with the dielectric materials under oxidizing atmospheres, thus making it impossible to provide internal electrodes on the dielectric materials. For example, if nickel is used as internal electrode materials, and heated at a temperature more than 300° C. in oxidizing atmospheres, it oxidizes and reacts with the dielectric material. Accordingly, when the base metals are used as internal electrode materials, it is necessary to fire the dielectric material with electrodes in neutral or reducing atmospheres to prevent the oxidation of base metals. However, under such firing conditions, the prior art dielectric ceramic materials are reduced greatly, and the specific resistance thereof is decreased to about 10 to $10^8 \Omega \cdot cm$, so that they cannot be used as dielectrics for capacitors.

It has been proposed to prevent the reduction of dielectric materials under the reducing atmosphere by the addition of a transition metal oxide, particularly, manganese oxide, for example, in the following publications:

(1) "High Permittivity Ceramics Sintered in Hydrogen", by J. M. Herbert, 1963;

(2) U.S. Pat. No. 3,920,781.

It is true that the addition of the transition metal oxide is effective to provide dielectric ceramic materials which are not reduced even if fired in neutral or reducing atmospheres. For example, barium titanate ceramic containing 1 mol % manganese dioxide possesses high specific resistance of approximately $10^{12} \Omega \cdot cm$ even after fired in the reducing atmosphere. However, the addion of the transition metal oxide has been accompanied by such disadvantages that the curie temperature of the material is considerably affected by an amount of the transition metal oxide, a firing temperature, a firing time and a firing atmosphere, and that the aging of the insulation resistance of the material becomes extremely great, as compared with conventional dielectric ceramic compositions fired in air.

It is therefore an object of the present invention to provide a dielectric ceramic composition which possesses high permittivity and small dielectric loss, and maintains high insulation resistance even if fired in reducing atmospheres.

Another object of the present invention is to provide a dielectric ceramic composition, of which the aging is very small, and the curie temperature is scarcely affected by the firing conditions.

A further object of the present invention is to provide a dielectric ceramic composition which makes it possible to manufacture multi-layer ceramic capacitors with internal electrodes of an inexpensive unnoble metal without deterioration of dielectric properties.

According to the present invention, there is provided a non-reducing dielectric ceramic composition comprising a solid solution represented by the compositional formula:

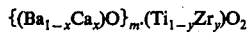

$$\{(Ba_{1-x}Ca_x)O\}_m \cdot (Ti_{1-y}Zr_y)O_2$$

wherein the subscripts $m$, $x$ and $y$ have the following values:

$1.005 \leq m \leq 1.03$
$0.02 \leq x \leq 0.22$
$0 < y \leq 0.20$

The above dielectric ceramic composition possesses high insulation resistance even if fired in neutral or reducing atmospheres, and the electrical properties and curie temperature thereof are scarcely affected by the firing conditions. Further, the aging of the insulation resistance is extremely small, as compared with the conventional non-reducing dielectric ceramic compositions.

The non-reducing dielectric ceramic composition of the present invention is intended for practical use as a dielectric material for monolithic ceramic capacitors, thus making it possible to manufacture inexpensive but highly reliable monolithic multi-layer ceramic capacitors.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be further apparent from the following description with reference to examples and the accompanying drawings, in which.

DETAILED DESCRIPTION OF THE INVENTION

EXAMPLE 1

Figure 1:
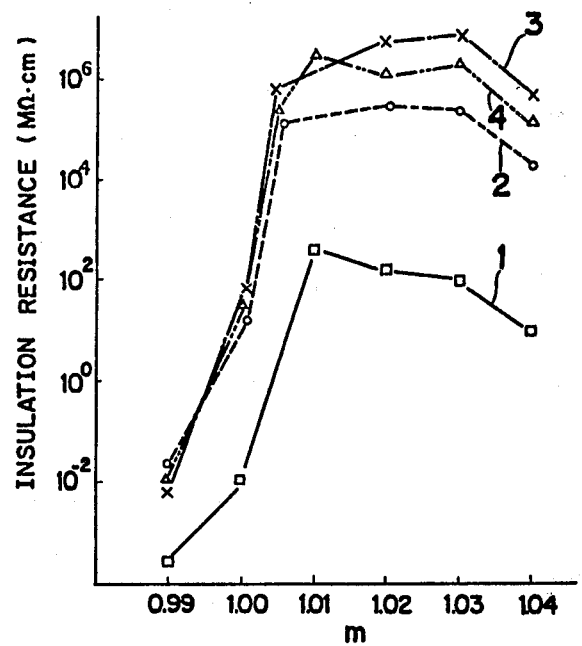
FIG. 1 is a graph showing the relation between insulation resistance and the value of $m$ for various compositions.

Powdered materials of barium carbonate ($BaCO_3$), calcium carbonate ($CaCO_3$), titanium dioxide ($TiO_2$), and zirconium oxide ($ZrO_2$) were used as starting materials. These materials all of which have purites more than 99% were weighed so as to provide final samples each consisting essentially of a composition represented by the formula: $\{(Ba_{1-x}Ca_x)O\}_m \cdot (Ti_{1-y}Zr_y)O_2$ and having the values of $m$, $x$ and $y$ shown in Table 1, and then mixed by the wet process to obtain a fully uniform or homogeneous mixture. After drying, each resultant mixture was presintered at a temperature of 1100° to 1150° C. in air for 2 hours. The presintered body was milled by the wet process together with 3 weight percent of a suitable organic binder, dehydrated, dried, and then subjected to granule face-smoothening. The resultant powder was press-molded into discs with a diameter of 14.5 mm and a thickness of 1.2 mm at a pressure of 750–1000 Kg/mm². The discs were placed in an alumina sagger having its bottom covered with zirconia powder, heated to 500° C. in air to burn the organic binder, and then fired at 1300° to 1370° C. in a reducing atmosphere consisting of hydrogen and nitrogen, the volume ratio of $H_2$ to $N_2$ being 1.5/100.

Sintered discs were provided with In-Ga alloy electrodes on opposed end surfaces, and then subjected to the measurement of electrical properties, i.e., insulation resistance (IR), permittivity ($\epsilon$), and dielectric loss (tan $\delta$) at room temperature. The results are shown in Table 1.

Table 1

| Sample No. | $\{(Ba_{1-x}Ca_x)O\}_m \cdot (Ti_{1-y}Zr_y)O_2$ | | | | IR | | tan $\delta$ |
|---|---|---|---|---|---|---|---|
| | m | 1−x | x | 1−y | y | (MΩ·cm) | $\epsilon$ | (%) |
| 1 * | 1.01 | 1.00 | 0 | 0.84 | 0.16 | 5.3 × 10² | 15700 | 39.4 |
| 2 | " | 0.98 | 0.02 | 0.84 | 0.16 | 7.4 × 10⁴ | 13050 | 3.0 |
| 3 | " | 0.95 | 0.05 | 0.99 | 0.01 | 8.1 × 10⁵ | 1720 | 2.3 |
| 4 | " | 0.90 | 0.10 | 0.84 | 0.16 | 4.4 × 10⁶ | 9533 | 1.33 |
| 5 | " | 0.82 | 0.18 | 0.80 | 0.20 | 7.2 × 10⁶ | 5410 | 0.77 |
| 6 | " | 0.78 | 0.22 | 0.85 | 0.15 | 6.9 × 10⁵ | 4190 | 0.94 |
| 7 * | " | 0.70 | 0.30 | 0.90 | 0.10 | 7.5 × 10² | 790 | 8.90 |
| 8 * | 1.00 | 0.90 | 0.10 | 1.00 | 0.00 | 1.1 × 10¹ | 970 | 19.40 |
| 9 | 1.005 | 0.80 | 0.20 | 0.85 | 0.15 | 6.6 × 10⁵ | 6340 | 2.40 |
| 10 | 1.02 | 0.91 | 0.09 | 0,95 | 0.05 | 1.7 × 10⁶ | 1220 | 2.60 |
| 11 | 1.03 | 0.97 | 0.03 | 0.92 | 0.08 | 2.4 × 10⁵ | 2190 | 2.20 |
| 12 * | 1.04 | 0.90 | 0.10 | 0.75 | 0.25 | 8.3 × 10² | 540 | 27.70 |

As can be seen from Table 1, the composition of sample No. 1 containing no Ca possesses low insulation resistance of 5.3 × 10² mΩ.cm and large dielectric loss (tan $\delta$), so that the composition of sample No. 1 is unsuitable as a dielectric material for multi-layer ceramic capacitors. It is observed that it is difficult to prepare a sintered body from a composition containing no Ca.

The compositions of samples Nos. 2 ∼ 6 and 9 ∼ 11 possess high insulation resistance more than 10⁴ MΩ.cm, high permittivity more than 1000 and small dielectric loss less than 3.5%. Therefore, it will be seen that the composition having the value of $m$ in the range of 1.005 to 1.03 and the value of $x$ in the range of 0.02 to 0.22 have excellent electrical properties suitable for use as dielectric ceramic materials for capacitors to be manufactured in reducing atmospheres.

It has been found that if the amount of Ca is more than 0.22, the sintering of the composition becomes difficult, and the electrical properties thereof become worse.

As can be seen from the results for samples Nos. 8 to 12, the compositions having the value of $m$ not more than 1.00 possess low insulation resistance not more than 10² MΩ.cm, while the compositions having the value of $m$ in the range of from 1.005 to 1.03 possess high insulation resistance not less than 10⁴ MΩ.cm, and have low dielectric loss not more than 3.0%. If the value of $m$ is 1.04 or above, the sintering of compositions progresses insufficiently. It has also been found that the compositions containing no $ZrO_2$ possess low insulation resistance and large dielectric loss. The incorporation of $ZrO_2$ improves such electrical properties, but the presence of $ZrO_2$ (i.e., the value of $y$) more than 0.20 makes it difficult to sinter the composition sufficiently.

EXAMPLE 2

Various ceramic compositions were prepared in the same manner as disclosed in Example 1, and subjected to the measurement of insulation resistance in order to examine as to how the insulation resistance of the compositions varies with the change of the value of $m$. The results are shown in FIG. 1. In this figure, lines 1 to 4 show the results for compositions of the following respective system:

Line 1: $(BaO)_m \cdot (Ti_{0.90}Zr_{0.10})O_2$
Line 2: $\{(Ba_{0.95}Ca_{0.05})O\}_m \cdot (Ti_{0.90}Zr_{0.10})O_2$
Line 3: $\{(Ba_{0.90}Ca_{0.10})O\}_m \cdot (Ti_{0.90}Zr_{0.10})O_2$
Line 4: $\{(Ba_{0.80}Ca_{0.20})O\}_m \cdot (Ti_{0.90}Zr_{0.10})O_2$ As can be seen from this figure, the insulation resistance of these compositions are increased considerably when $m$ takes a value in the range of from 1.005 to 1.03. It is also understood that the reference compositions containing no Ca possess low insulation resistance even if $m$ takes a value greater than or equal to 1.005, but smaller than or equal to 1.03 (See FIG. 1 line 1), while the compositions containing Ca in an amount of 0.05, 0.10 or 0.20 possess high insulation resistance not less than 10⁵ MΩ.cm when $m$ takes a value of that range (See FIG. 1 lines 2, 3 and 4).

From the results in the above examples, it will be understood that the dielectric ceramic composition of the present invention are suitable for use as dielectric materials for multi-layer ceramic capacitors to be manufactured by the process comprising firing the composition in reducing atmospheres.

EXAMPLE 3

Dielectric ceramics were prepared having the same composition as that of sample No. 4 in Example 1, and conventional dielectric ceramics having the composition consisting of $BaO \cdot (Ti_{0.88}Zr_{0.12})O_2$ and 1 mol% of MnO$_2$ under various firing conditions. These ceramics were subjected to measurements of insulation resistance (IR), permittivity ($\epsilon$), dielectric loss (tan $\delta$) and curie temperature. The results are shown in Table 2 together with firing conditions.

Table 2

BaO · (Ti$_{0.88}$Zr$_{0.12}$)O$_2$ + 1 wt % MnO$_2$

| Sample No. | Firing atm. H$_2$/N$_2$ | Firing temp. (° C) | IR (MΩ · cm) | $\epsilon$ | tan $\delta$ (%) | Curie temp. (° C) |
|---|---|---|---|---|---|---|
| 13 | 0/100 | 1320 | 6.7 × 10$^6$ | 8500 | 6.03 | 18 |
| 14 | 2/100 | " | 3.3 × 10$^6$ | 9830 | 2.14 | 25 |
| 15 | 5/100 | " | 8.6 × 10$^5$ | 7760 | 2.00 | 42 |
| 16 | 10/100 | " | 1.1 × 10$^2$ | 4110 | 11.20 | 58 |
| 17 | 2/100 | 1360 | 6.0 × 10$^6$ | 7150 | 1.90 | 40 |

{(Ba$_{0.90}$Ca$_{0.10}$)O}$_{1.01}$ · (Ti$_{0.80}$Zr$_{0.20}$)O$_2$

| Sample No. | Firing atm. H$_2$/N$_2$ | Firing temp. (° C) | IR (MΩ · cm) | $\epsilon$ | tan $\delta$ (%) | Curie temp. (° C) |
|---|---|---|---|---|---|---|
| 18 | 0/100 | 1330 | 9.0 × 10$^6$ | 7700 | 1.88 | 21 |
| 19 | 2/100 | " | 7.2 × 10$^6$ | 8100 | 1.70 | 24 |
| 20 | 5/100 | " | 2.6 × 10$^6$ | 7900 | 2.50 | 24 |
| 21 | 10/100 | " | 1.3 × 10$^2$ | 10320 | 17.44 | 27 |
| 22 | 2/100 | 1370 | 8.7 × 10$^6$ | 8710 | 1.50 | 25 |

As can be seen from the results in Table 2, the addition of MnO$_2$ is effective to improve the insulation resistance of titanates when fired in reducing atmospheres, but the increase of the reducing power of firing atmosphere tends to shift the curie temperature thereof to higher temperatures, and to considerably vary the permittivity at room temperature. Further, the curie temperature of the composition containing MnO$_2$ is varied by the variation of the firing temperature (See samples Nos. 1 and 17). It is also known that the curie temperature of such a composition is shifted to lower temperatures at the rate of about 30° C./1 mol % by an amount of MnO$_2$ although no experimental data is listed in Table 2.

In contrast with the conventional compositions containing MnO$_2$, the composition of the present invention is stable in electrical properties and small in the shift of the curie temperature even when fired in various reducing atmospheres in which the ratio of H$_2$ to N$_2$ is less than or equal to 5/100. In other words, the composition of the present invention is scarcely affected on its electrical properties and curie temperature by the firing conditions such as firing temperature, and the reducing power of the atmosphere. Accordingly, it is possible to readily produce dielectric ceramic compositions having the desired electrical properties by mixing the ingredients so as to have a value of m in the range of 1.005 to 1.03, a value of x in the range of 0.02 to 0.22, and a value of y not more than 0.20. It is, however, to be noted that a small amount of MnO$_2$ may be incorporated into the composition of the present invention to further improve the sintering property and insulation resistance although the addition of MnO$_2$ causes undesirable results as mentioned above.

EXAMPLE 4

The compositions of samples Nos. 4 and 14 were subjected to an electrical endurance test, and the aging of insulation resistance was determined. The test was carried out by keeping the samples at 85° C. and applying a DC voltage of 500v/mm. The results are shown in Table 3.

Table 3

| Sample No. | Insulation Resistance (MΩ · cm) | | | |
|---|---|---|---|---|
| | Initial | After 100 hrs | After 500 hrs | After 1000 hrs |
| 4 | 6.3 × 10$^6$ | 4.0 × 10$^6$ | 2.8 × 10$^6$ | 2.8 × 10$^6$ |
| 14 | 4.0 × 10$^6$ | 7.7 × 10$^5$ | 5.2 × 10$^5$ | 9.7 × 10$^4$ |

From Table 4, it is understood that the insulation resistance of the conventional composition (sample No. 14) deteriorates greatly with the lapse of time, while that of the composition of the present invention is scarcely decreased. Thus, the aging of the insulation resistance of the composition of the present invention is considerably small.

EXAMPLE 5

There was prepared presintered ceramic powder having the composition {(Ba$_{0.90}$Ca$_{0.10}$)O}$_m$·(Ti$_{0.84}$Zr$_{0.16}$)O$_2$ in the same manner as disclosed in Example 1. The presintered powder was mixed with 15 wt% of an aqueous solution containing an organic binder, a dispersing agent and an antifoaming agent, and then ball-milled together with 50 wt% of water. The resultant slurry was formed into ceramic green sheets having a thickness of 60$\mu$ by the known doctor blade method, and then an internal electrode was screened on each green sheet with a paste containing nickel powder having particle size of about 1$\mu$. Subsequently 20 sheets of the green sheets were then stacked, pressed and cut to form monolithic multi-layer structures.

The monolithic multi-layer unit was heated to 500° C. in air to burn the organic binder, further heated to a firing temperature of 1340° C. at a rate of 100° C./hr in a reducing atmosphere consisting essentially of H$_2$ and N$_2$ in which the volume ratio of H$_2$ to N$_2$ is 2/100, and then kept at that temperature for 2 hours. After sintering, the monolithic multi-layer unit was cooled to 800° C. at a rate of 100° C./hr, and then cooled spontaneously to room temperature in that reducing atmosphere. The sintered monolithic multi-layer unit was then provided with In-Ga alloy layers as terminations for measurements of electrical properties thereof.

The electrical properties of the above monolithic multi-layer unit are listed below together with its dimensions.

Dimensions

Length: 5.6 mm
Width: 4.8 mm
Thickness: 1.0 mm

Electrical Properties

Figure 2:
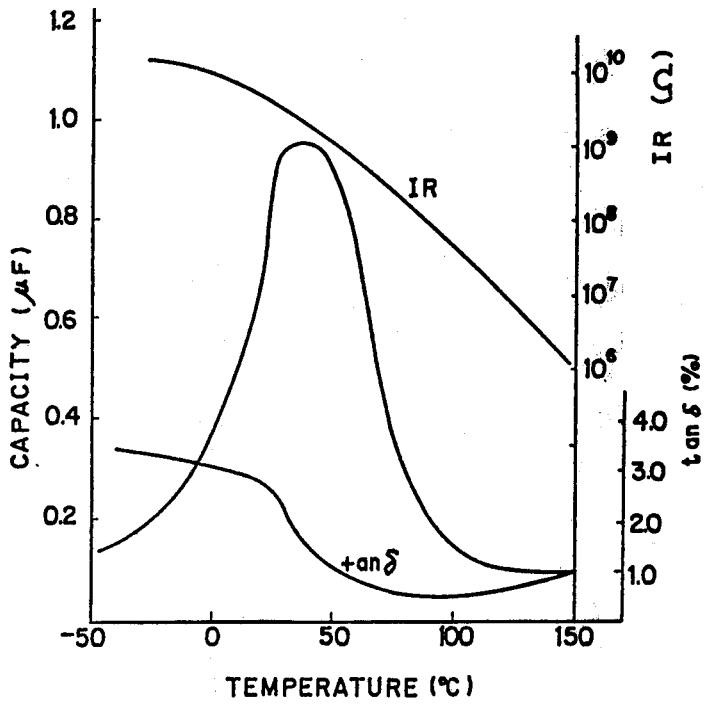
FIG. 2 is a graph showing temperature dependencies of capacity, insulation resistance and dielectric loss of the monolithic ceramic capacitors comprising the composition of the present invention.

Capacity: 0.85$\mu$F
Dielectric loss(tan $\delta$): 2.5%
Insulation resistance: 9.5 × 10$^9$Ω.cm
Capacity × Insulation resistance: 8075 MΩ.$\mu$F The temperature dependencies of capacity, insulation resistance (IR) and tan $\delta$ of the above unit are respectively shown in FIG. 2.

From the above results, it will be understood that non-reducing dielectric ceramic compositions of the present invention make it possible to manufacture inexpensive but high reliable monolithic ceramic capacitors.

Although a mixture of N$_2$ and H$_2$ was used in the above examples as a reducing atmosphere, any mixture such as Ar—H$_2$ or CO$_2$—CO may be used as reducing atmospheres.

In example 5, dielectric ceramic green sheets were prepared by the doctor blade method, but any known method such as the printing method, spray method or pulling method may be used for the preparation thereof.

Although nickel was used in example 5 as a material for internal electrodes, any unnoble metal or alloy thereof may be also employed. For example, metals such as iron, cobalt and alloys thereof may be used therefor.

The invention being thus described, it will be obvious that the same may be varied in many ways. Such variations are not to be regarded as a departure from the spirit and scope of the invention, and all such modifications as would be obvious to one skilled in the art are intended to be included herein.

What we claim is:

1. A method for making a monolithic ceramic capacitor with internal electrodes made of base metal or alloy of the group consisting of nickel, iron, cobalt and alloys thereof, the method comprising the steps of preparing a plurality of dielectric green sheets with a dielectric ceramic composition, forming an internal electrode on each green sheet, stacking and pressing the resultant green sheets to form a monolithic multilayer unit, and providing terminations for the resultant monolithic unit, the terminations being electrically connected to the internal electrodes of the monolithic unit, wherein the improvement comprises mixing and presintering raw materials in such compositional proportions to produce said dielectric ceramic composition having the formula $$\{(Ba_{1-x}Ca_x)O\}_m \cdot (Ti_{1-y}Zr_y)O_2$$

wherein
 $1.005 \leq m \leq 1.03$
 $0.02 \leq x \leq 0.22$
 $0 < y \leq 0.20,$
and the firing is effected in a reducing atmosphere containing hydrogen.

2. The method claimed in claim 1 wherein the firing is effected at a temperature in the range of 1300° to 1370° C.

3. The method claimed in claim 1 wherein the reducing atmosphere contains 1 to 5 vol% of hydrogen.